Oct. 3, 1933.    G. F. MYERS    1,928,980
AIRCRAFT
Filed March 13, 1929    3 Sheets-Sheet 1
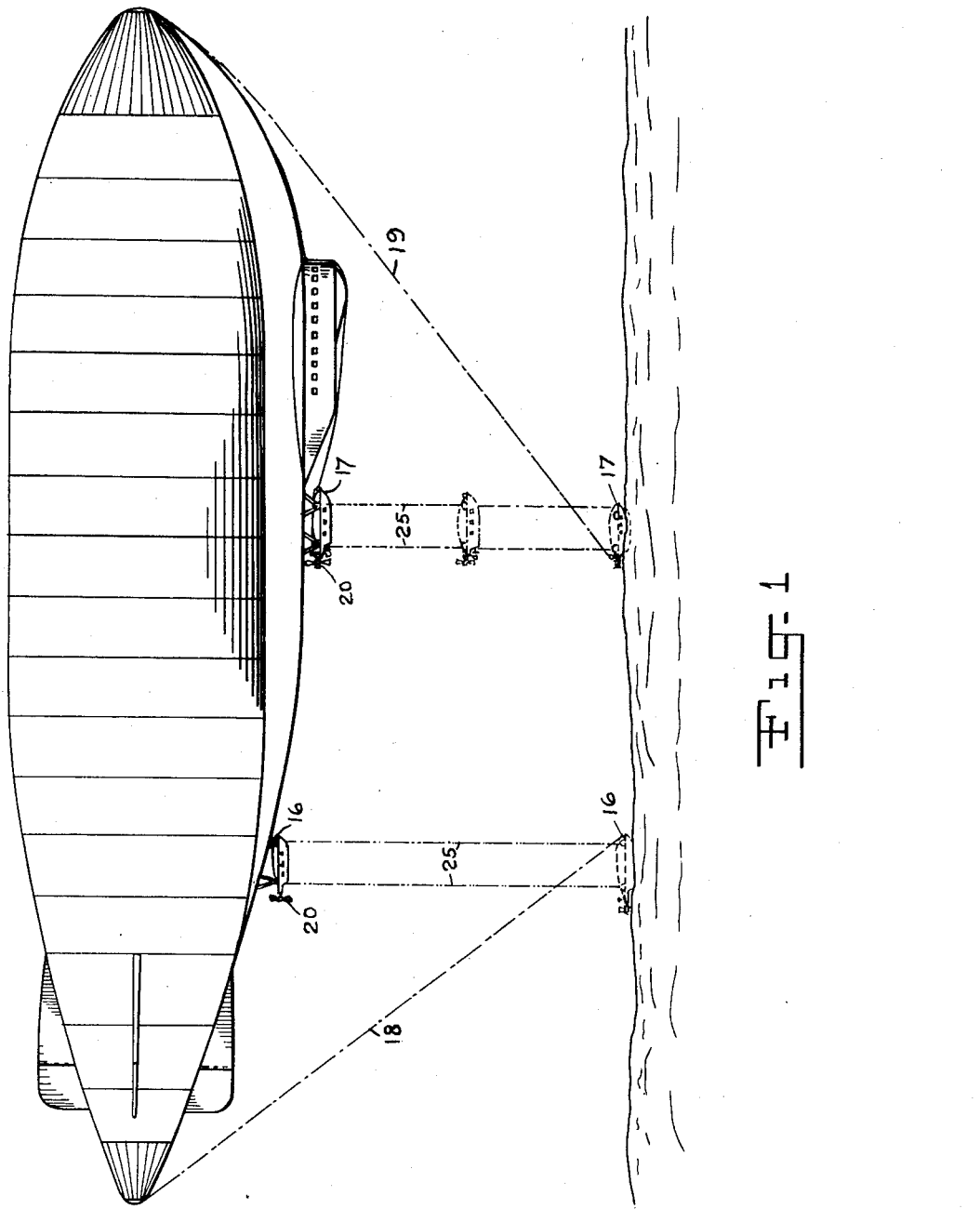
Inventor
George Francis Myers.
By his Attorney Oct. 3, 1933.  G. F. MYERS  1,928,980
AIRCRAFT
Filed March 13, 1929  3 Sheets-Sheet 2
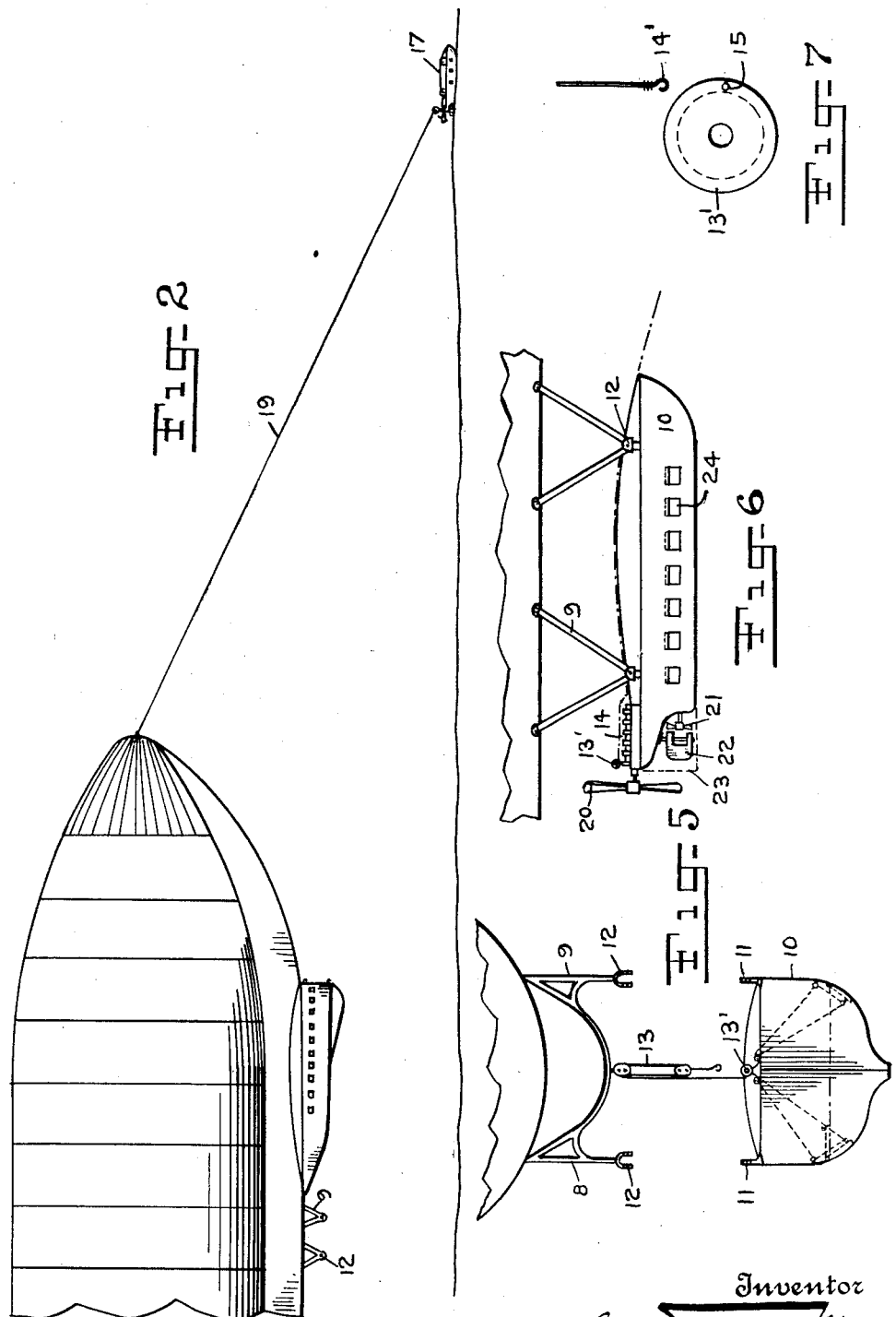

Oct. 3, 1933.   G. F. MYERS   1,928,980
AIRCRAFT
Filed March 13, 1929   3 Sheets-Sheet 3
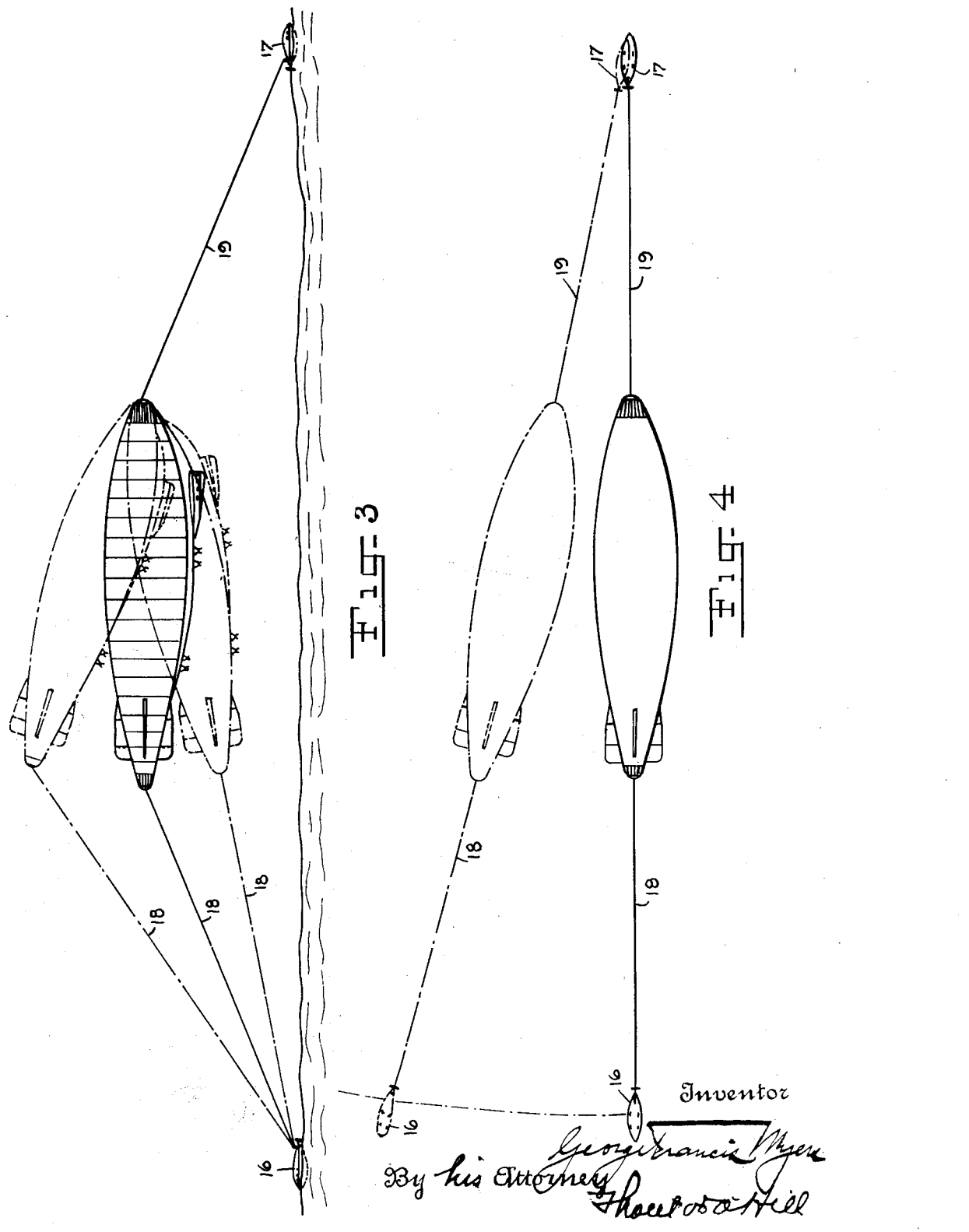

Patented Oct. 3, 1933

1,928,980

UNITED STATES PATENT OFFICE 1,928,980

AIRCRAFT

George Francis Myers, Jackson Heights, N. Y.

Application March 13, 1929. Serial No. 346,534

27 Claims. (Cl. 244—2)

My invention relates to improvements in aircraft and more particularly has reference to and is illustrated in the accompanying drawings in its application to the anchoring or controlling of a dirigible preferably at sea, or upon water, though it will be readily understood that the same applies to control of the same upon land.

Referring to said drawings, Fig. 1 illustrates in side elevation, a suitable form of dirigible, held substantially stationary over a body of water. Fig. 2 illustrates part of said dirigible under control from the surface of the water in a slightly different position. Figs. 3 and 4 illustrate in side elevation and plan views respectively, modified controls of the dirigible. Fig. 5 illustrates upon an enlarged scale, an end view of the nacelle, and suspension means. Fig. 6 is a side elevation, looking from left to right at Fig. 5, with the air propeller and engine added, and Fig. 7 is an enlarged detail of part of the winch and cable mechanism.

According to the preferred embodiment of my invention, the nacelle car fuselage, receptacle, or the like or power plant, as a unit, is removably attached to the frame work of the dirigible by any suitable means, such as brackets 8, 9, the frame or housing of the nacelle being preferably substantially boat shaped, as indicated at 10, the upwardly extending lugs 11 therein, being perforated transversely to receive bolts also passing through transverse holes in the stirrup ends 12 of the brackets 8, 9. A suitable form of block and tackle 13, may be employed for raising and lowering the nacelle, and to aid in releasing and applying the bolts connecting the same to the brackets 8, 9. For this purpose a suitable winch device 13' may be set in motion by the engine 14 on the nacelle, the hook 14', at the free end of the cable, being adapted to engage the pin 15 of the winch as shown.

These nacelles are preferably carried fore and aft beneath the dirigible as indicated at 16, 17. 18, 19 indicate cables secured at the bow and stern of the dirigible and also to the nacelles as shown for controlling the dirigible. When the nacelles are attached to the dirigible, and are in their proper places for the purposes of flight, the slack of these cables is taken up by suitable winches on board the nacelles, and substantially follow the outline of the dirigible. When lowering the nacelles, these cables are slacked up or paid out the proper distance, for the desired control.

20 indicates the air propellers, which may be of any number or design desirable, for each nacelle, and 21 indicates water propellers also mounted thereon, any of which may be driven from the engine 14 in any well known manner. 22 indicates the marine rudder and 23, a suitable removable housing around the marine propeller and rudder, to be used when the same is in flight to conform to suitable stream lines and reduce resistances. 24 indicates port holes which may be controlled from within the nacelle, so that, when upon the water, enough water or ballast may be admitted for adding the necessary weight for controlling the dirigible. When the nacelle is to be returned to the dirigible, this water is of course, pumped out to lighten the same, after which the nacelle is drawn up beneath the dirigible for flight purposes.

The cable 19, on the bow of the dirigible, is preferably connected at the stern of the forward nacelle 17, while the cable 18, at the stern of the dirigible, is preferably connected at the bow of the nacelle 16, so that, when down in the position shown in Figs. 1 to 4 inclusive, by drawing up on the lines 18, 19, the nacelles can, if sufficiently weighted, substantially anchor or position the dirigible in a stationary manner. One form of holding the dirigible is illustrated in Fig. 1 where the nacelles are in position for lowering or elevating and substantially maintain the position of the dirigible. In the meantime, for more extended anchorage, however, the forward nacelle 17 is preferably driven forwardly on the water and the stern nacelle 16 is preferably turned around and driven rearwardly, and allowing the line 18 to shift from bow to stern of the nacelle, if desired. While in this position, the dirigible is anchored fore and aft at widely separated points by the two nacelles as shown in Figs. 3 and 4, and is held substantially stationary, even though the bow, or preferably the stern of the dirigible, may swing slightly one way or the other, according to the shifting winds, and of course, a greater amount of water can be let into the forward nacelle 17, if desired, to maintain the bow point of anchorage, the more stationary of the two as shown. Each of these nacelles being provided with a marine propeller and rudder, are at all times under complete control, and, properly weighted, will serve to safely maneuvre or control the dirigible for all necessary purposes. When flight is desired, the nacelles may be returned to the positions shown in outline in Fig. 1, by operating the proper winches on board the same and made fast for air navigation. In the management of the nacelles, the suspension cables 25, may remain hanging free of the nacelles or may be paid out, so as to always be in connection therewith, as may be found desirable.

As my invention is in some of its aspects generic I do not limit myself to the particular construction shown and described, but also contemplate the employment of such equivalents as fairly fall within the scope of the claims.

In this connection it may be stated as aforesaid that the dirigible may be anchored and controlled when over the land as well as over the sea; in this case the nacelle or car or fuselage or receptacle or the like may have wheels attached as in ordinary automobile or tractor practice.

Therefore it should be understood that different modifications and improvements may be created, that various changes may be made in the form, proportion, size and detail of the several structures shown, that the number and position of certain elements may be varied, and that the character of the flying machine may be altered without departing from the spirit of the invention.

I claim:

1. The method of anchoring a dirigible while in the air, consisting in lowering a pair of nacelles to the earth by hoisting cables running substantially vertically, detaching the cables, and planting one nacelle forward of the dirigible with its tethering cable attached obliquely, and the second nacelle with its tethering cable also attached obliquely in the opposite direction from the said first mentioned cable.

2. A method of anchoring a dirigible while the same is in the air, consisting in holding the dirigible between two man carrying, power driven, dirigible machines on the earth, ballasting one of the machines, and moving the other from place to place transversely to the direction of the wind as the dirigible swings to port or starboard.

3. A method of anchoring a dirigible while the same is in the air, consisting in holding the dirigible between two man carrying, power driven, dirigible machines on the earth, and pulling away by the machines from the dirigible in a line longitudinally thereto and at a distance therefrom.

4. A method of anchoring a dirigible while in the air the dirigible having a pair of releasably attached nacelles, consisting in lowering the nacelles to the earth spreading the nacelles fore and aft of the dirigible till their tethering cables are taut, ballasting the forward nacelle to act as a pivot, and maneuvering the after nacelle back and forth transversely as the dirigible swings to port or starboard.

5. In combination, a dirigible, a nacelle detachable from the dirigible, means for lowering the nacelle to the earth, and other independent tethering means attached to both the dirigible and nacelle for anchoring the dirigible by the nacelle.

6. In combination, a dirigible, a nacelle detachable from the dirigible, means for lowering the nacelle to the earth, and independent, tethering means attached to both the dirigible and nacelle disconnected from the said lowering means for anchoring the dirigible by the nacelle.

7. In combination, a dirigible, a nacelle detachable from the dirigible and mounted between the nose and tail of the dirigible, means for lowering the nacelle to the earth, and independent tethering means attached to both the dirigible and nacelle mounted adjacent the nose of the dirigible.

8. In combination, a dirigible, a nacelle detachable from the dirigible, means for lowering the nacelle to the earth, and independent tethering means attached to both the dirigible and nacelle mounted adjacent the tail of the dirigible.

9. In combination, a dirigible, a plurality of nacelles detachable from the dirigible, means for lowering the nacelles from the dirigible, and independent tethering means attached to both the dirigible and nacelle mounted adjacent both the nose and the tail of the dirigible.

10. In combination, a dirigible, a nacelle, a hoisting cable, and an independent tethering cable attached to both the dirigible and nacelle.

11. In combination, a dirigible, a nacelle, hoisting cables whose point of attachment is amidships the dirigible, and a tethering cable attached to both the dirigible and nacelle whose point of attachment is adjacent the nose of the same.

12. In combination, a dirigible, a nacelle, a hoisting cable whose point of attachment is adjacent the midship portion of the dirigible, and a tethering cable attached to both the dirigible and nacelle whose point of attachment is adjacent to the tail of the dirigible.

13. In combination, a dirigible, nacelles, hoisting cables mounted on the dirigible amidships thereof, and a pair of tethering cables attached to both the dirigible and nacelle mounted adjacent both the nose and the tail of the dirigible and connected to the nacelles.

14. In combination, a dirigible, a plurality of nacelles detachable from the dirigible, cables for lowering the nacelles to the earth, and independent anchoring cables one thereof being attached to the nose of the dirigible and the tail of one nacelle, and another anchoring cable being attached to the tail of the dirigible and to the nose of another nacelle.

15. In combination, a dirigible, a plurality of nacelles detachable from the dirigible, cables for lowering the nacelles to the earth, and independent anchoring cables one thereof being attached to the nose and the other to the tail of the dirigible, and the other ends of the anchoring cables being attached to the rear parts of the nacelles.

16. In combination, a dirigible, a nacelle, hoisting cables for lowering and bringing back the nacelle from and to the dirigible, and a plurality of members on the nacelle at substantially the four corners thereof registering with an equal number of holding members on the dirigible, and means for fastening the first and second mentioned members together.

17. In combination, a dirigible, a nacelle, a hoisting cable, a tethering cable attached to both the dirigible and nacelle, and means on the nacelle for permitting water to fill the hull thereof to act as a centering point for the dirigible when the same drifts away the length of the cable tow and the same becomes taut.

18. A method of anchoring a dirigible while the same is in the air and over the water, consisting in holding the dirigible between two man carrying power driven dirigible boats on the water, ballasting one of the boats, and moving the other boat from place to place transversely to the direction of the wind as the dirigible swings to port or starboard.

19. A method of anchoring a dirigible while the same is in the air and over the water, consisting in holding the dirigible between two man carrying power driven dirigible boats on the water, and pulling away by the boats from the dirigible in a line longitudinally thereto and at a distance therefrom.

20. A method of anchoring a dirigible while the same is in the air and over the water the dirigible having a pair of releasably attached boats thereon, consisting in lowering the boats to the water, spreading the boats fore and aft of the dirigible till their tethering cables are taut, ballasting the forward boat to act as a pivot, and maneuvering the after boat back and forth transversely as the dirigible swings to port or starboard.

21. The method of maneuvering a dirigible while in the air and over the water, consisting in lowering a boat from the dirigible to the water, opening ports in the body of the boat, permitting water to flow into the hull of the same, maneuvering the boat as a pivot to the dirigible, lowering another boat from the dirigible to the water, maneuvering the same back and forth transversely as the dirigible swings to port or starboard, pumping out the water from the first mentioned boat, lifting both boats to the dirigible, and flying away.

22. A rigid airship having one or more pairs of sea-anchors embodying means for acquiring and retaining an added water load, means on the ship for lowering and hoisting said sea-anchors, one of each of said pair of sea-anchors being on opposite points of the keel of the ship, whereby axial trim and unnecessary movement of the ship may be controlled by the crew.

23. In combination with a dirigible, of an anchorage therefor, and means for turning the dirigible on a pivot exterior to the same through three hundred and sixty degrees as well as changing the position of the pivot longitudinally.

24. In combination with a dirigible, of an anchorage therefor, means for turning the dirigible on a pivot exterior to the same through three hundred and sixty degrees, and means for changing the position of the pivot longitudinally.

25. In combination with a dirigible, of a floating anchorage therefor, means on the anchorage for submerging the same, other means on the anchorage for changing the position of the same longitudinally, and means comprising a second floating anchorage for turning the dirigible on the first mentioned anchorage as a pivot through three hundred and sixty degrees.

26. In combination with a dirigible, of an anchorage pivot adjacent the front thereof, means secured to said dirigible adjacent the rear thereof for turning the dirigible on said pivot through three hundred and sixty degrees, means for moving the anchorage longitudinally, and means for holding the rear end of the dirigible at a lower elevation than the front end.

27. In combination with a dirigible, of a floating anchorage pivot adjacent the front thereof, means comprising a second floating anchorage secured to the said dirigible adjacent the rear thereof for turning the dirigible on said pivot through three hundred and sixty degrees, means for moving the first mentioned anchorage longitudinally, and means comprising a cable for holding the rear end of the dirigible at a lower elevation than the front end.

GEORGE FRANCIS MYERS.